Figure 1:
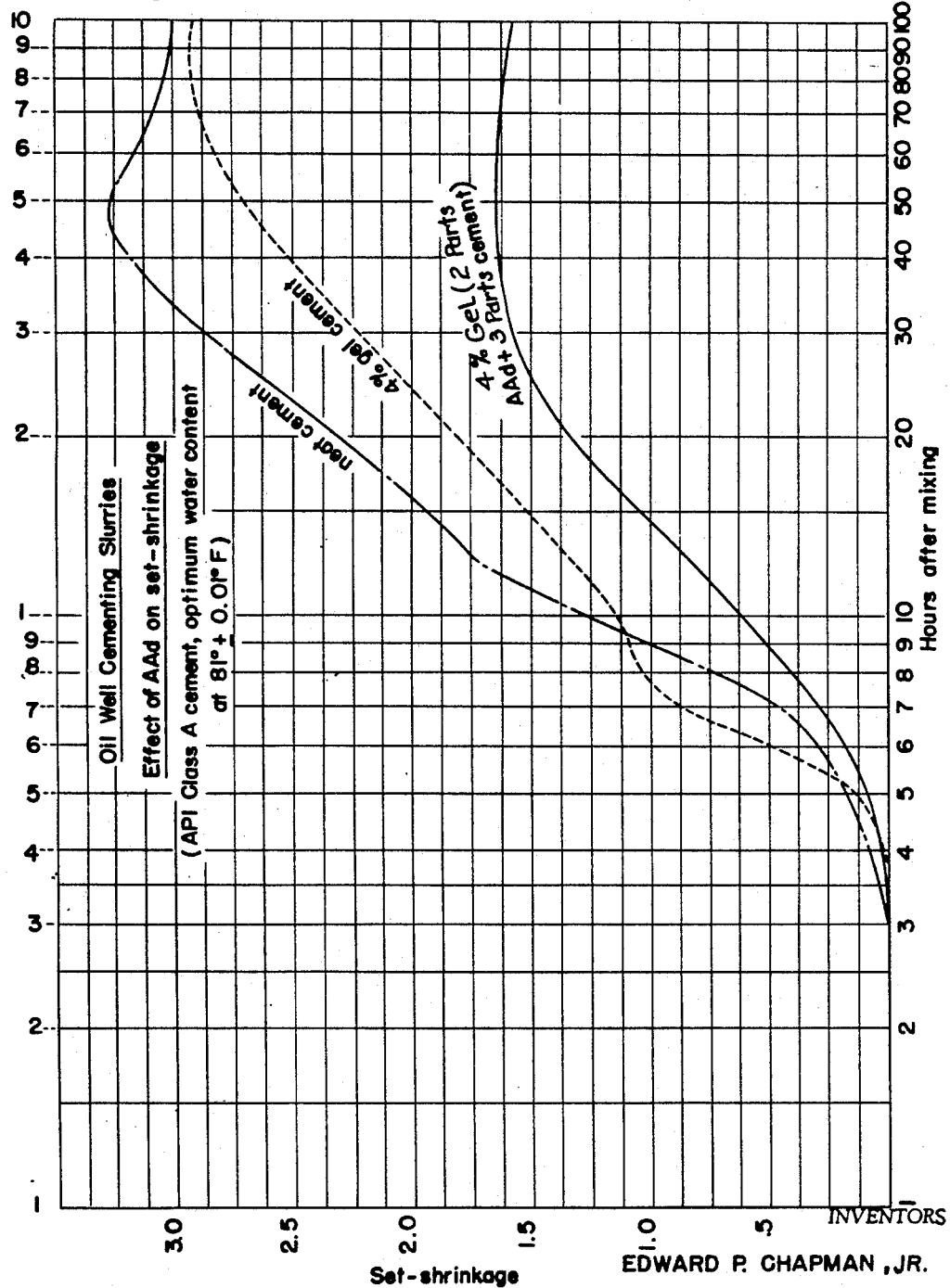

United States Patent Office 2,846,327
Patented Aug. 5, 1958

2,846,327

OIL WELL CEMENT COMPOSITION

John A. Wood and Edward P. Chapman, Jr., Albuquerque, N. Mex., assignors to Vernon F. Taylor, Jr.

Application August 10, 1954, Serial No. 448,804

3 Claims. (Cl. 106—97)

Our invention relates to an oil well cement composition and more especially to such compositions and a method of preparing the same as used in cementing oil wells and other earth bores and to the improved wells and bores themselves.

One of the objects of our invention is the provision of a cementing composition which is light in weight, inexpensive, readily available, easily handled with freedom from packing, and which in use readily forms a slurry, possessing slow-setting characteristics, yet which gives adequate set-strength and which is of especially low set-shrinkage.

Another object is the provision of cementing compositions and a method of preparing the same which compositions have special properties that make the cementing of an earth bore easier and less costly than at present, and which, in addition, improve the characteristics of the set-up cement, thus contributing to a better, more economical, and more permanent cementing job.

A further object of our invention is the provision of improved earth bores which possess better seal and shut-off than those heretofore known, which reliably assure prolonged well operations and which are especially resistant to the attack of corrosive water.

Other objects of our invention and the advantages thereof in part will be apparent and in part particularly pointed out in the course of the description which follows.

Our invention accordingly resides in the combination of elements, composition of ingredients and mixture of materials and in the several operational steps and the relation of each of the same to one or more of the others as more particularly described herein, the scope of the application of which forms the subject of the claims at the end of this specification.

Figure 2:
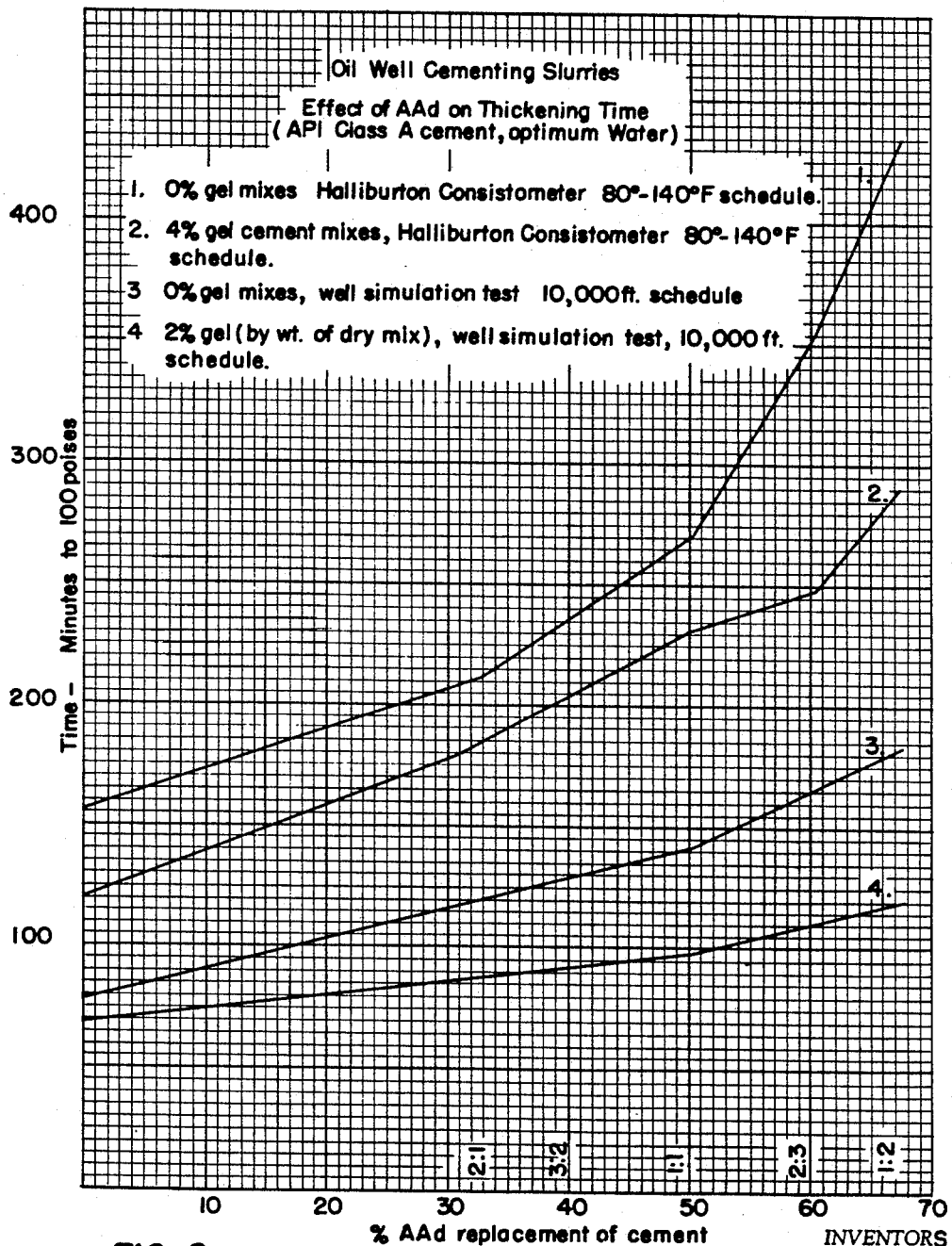

Certain features of our invention are shown in the drawings wherein:

Fig. 1 presents graphic illustration of set-shrinkage versus time for several oil well cementing slurries, and Fig. 2 illustrates the time required to achieve a uniform thickening of various slurries under different conditions of temperature and pressure.

As conducive to a better understanding of certain features of our invention it may be noted at this point that in oil well drilling operations it frequently becomes necessary to seal off portions of the well, so as to prevent entrance of water or preclude sloughing off the side-walls. Commonly this is achieved by cementing a steel casing inside the bore with Portland cement or with a mixture of Portland cement and up to 15% or 20% of some gelling agent such as Wyoming bentonite. But we find that there is an objectionable amount of shrinkage in the setting of these compositions and that they are subject to rapid attack by various corrosive waters; not only is the cementing material objectionably attacked but, of even greater consequence, the water penetrates into the composition and causes destructive corrosion of the casing, resulting in extensive and expensive well repairs, or in extreme cases, loss of the well.

It is an object of our invention therefore to provide a bore and well with improved corrosive water shut-off and better protection of steel casing, which is less pervious than those of the prior art and which is well calculated to withstand the conditions of corrosion, erosion and even shock which are encountered in actual practical use. A further object is to provide a cement composition which is readily available and which quickly lends itself to use in the field with effective and reliable results.

Referring now to the practice of our invention we provide cementing compositions composed essentially of a material, which consists in large degree of anhydrite (anhydrous calcium sulphate) which in itself has little or no cementitious properties and whose other chemical and physical properties will be hereinafter described, this material being mixed in varying proportions with Portland cement, and thus used for the cementing operation, with or without aggregates or other admixes.

In the practice of our invention the anhydrite admix, hereinafter termed "anhydrite admix" or designated "AAd" is prepared from naturally occurring earth deposits which contain a major portion of calcium sulphate. The process employed involves drying, grinding to desirable particle size, and heating to a temperature sufficiently high to dehydrate gypsum completely to anhydrite, leaving no appreciable amounts of raw gypsum or of plaster of Paris in the product. The source material may be relatively pure gypsum, but it may also contain minor amounts of other materials, such as sand, soil, clays, sulphur, and diatomite, together with substances of organic origin up to 50% by weight without interfering seriously with the valuable properties of the product, all provided, however, that the calcining after drying and grinding is carried out at a sufficiently high temperature, notably 1200° F. or higher. A suitable size gradation shows less than 1% by weight retained on a U. S. No. 20 sieve and not less than 75% by weight passing a U. S. No. 100 sieve.

In preparing the anhydrite admix we prefer to use a rotary kiln for drying the gypsiferous earth, a dry ball mill for comminuting to a desirable range of particle sizes, and a stationary downdraft vertical kiln for the final calcination, with a conventional dust collecting system to collect the final product from the hot gas stream. In the calcining kiln we cause the powdered product from the grinder to fall through a sheet of flame, thereby being "flash-calcined" to form the desired synthetic anhydrite admix. Impurities present, such as clays, sulphur and organic matter, are dehydrated or oxidized to substances which are not deleterious to the properties of the cementing compositions in which the product is used in accordance with our invention as hereinafter set forth.

We, of course, are aware that calcium sulphate, generally in the form of gypsum, is used in various ways in the manufacture of Portland cement. But the amount present in Portland cement is small, ordinarily being substantially less than 4% of the total weight. The compositions of our invention, however, require the addition of an admix which consists largely of calcium sulphate, in the form of anhydrite, to Portland cements which already contain conventional amounts of calcium suphate. Our compositions, therefore, contain critically greater amounts of calcium sulfate, and in a different chemical and physical form than is used in the manufacture of Portland cement.

As a specific illustration of the cementing compositions of our invention we used as starting material a gypsiferous-diatomaceous earth from a surface deposit in Ector County, Texas This was dried, comminuted and calcined as described above. The physical properties of the resulting admix are set out in Table I. Products equally useable for the purposes of our invention have been made in the same manner from a gypsum of relatively high purity from deposits near San Ysidro, New Mexico; from a gypsiferous-clay-sand from the salt lake area in Torrance County, New Mexico; and various gypsiferous-diatomaceous earths from West Texas and Eastern New Mexico.

TABLE I

*Anhydrite admix*

PHYSICAL AND CHEMICAL PROPERTIES OF AAd

[From gypsiferous-diatomaceous earth, Ector Co., Texas.]

| | |
|---|---|
| Specific gravity | 2.76 |
| Density, absolute | lbs./cu. ft.. 171.5 |
| Apparent bulk density | lbs./cu. ft.. 82.0 |
| Absolute volume of 82.0 lbs | cu. ft.. 0.478 |

Sieve analysis:

| U. S. Sieve No. | Weight Percent Retained | |
|---|---|---|
| | Individual | Cumulative |
| 20 | 0 | 0 |
| 30 | 0.5 | 0.5 |
| 50 | 3.7 | 4.2 |
| 100 | 17.9 | 22.1 |
| 140 | 7.4 | 29.5 |
| 200 | 12.6 | 42.1 |
| 270 | 7.8 | 49.9 |
| Pan | 50.1 | 100.0 |

Chemical analysis:

| | Percent |
|---|---|
| $SiO_2$ | 20.3 |
| $Al_2O_3$ | 1.4 |
| CaO | 30.5 |
| MgO | 0.29 |
| $Na_2O$ | 0.96 |
| $K_2O$ | 0.62 |
| $SO_3$ | 39.1 |
| Cl | 1.2 |
| Fe | 0.37 |
| Ign. loss (1000° C.) | 3.10 |

Water holding capacity—to form a stable slurry without appreciable water separation. 5.18 gallons (43.2 lbs.) per dry cubic foot (82 lbs.).
Cementitious value—nil. Slurry still fluid after holding in constant temperature water bath at 100° F. for 7 days.
Porosity—negligible. Density of 1:2 cement: admix slurry:

| | Lb./gal. |
|---|---|
| Atmospheric pressure | 14.2 |
| 10,000 p. s. i. | 14.3 |

Ease of handling—product non-caking, non-packing, free-flowing, and handled easily without any difficulty with conventional oil field cementing equipment.
Abrasiveness—no greater than Portland cement.

The product described in Table I forms a stable slurry with water, both by itself and in all mix ratios with Portland cements, either with or without the addition of Wyoming bentonite gel. The slurries made by mixing this product with Portland cements and water, with or without gel or other additives, where used, which constitute a part of our invention, include all types of Portland cement, such as the regular or construction type (ASTM Type I, or API Class A), the high early strength, moderate sulphate resisting type (ASTM Type II or API Class B), or any other Portland cement, whether or not made especially for oil well cementing.

Slurries for oil well cementing, and which constitute examples of our invention, were prepared by first forming a dry-mix of a Portland cement and AAd prepared as described above, using weighed amounts of each. In some cases Wyoming bentonite gel was added to the dry-mix. The dry-mix was then poured into a measured volume of water, stirred to wet the powder, and the mixing completed by "blending" for 30 seconds in a high speed mixer of the Waring Blendor type. The water-to-solids ratios were adjusted to give fluid slurries in the consistency ranges normally used for cementing oil wells. The slurry density was measured by weighing a known volume. Test specimens, 2-inch cubes, then were cast in triplicate in metal gang molds. These were placed in a constant temperature water bath until time for testing, except when the curing period was greater than 24 hours the specimens were removed from molds and held in the bath for the requisite time.

Slurries were prepared as above from regular Portland cement (ASTM Type I, or API Class A) with our anhydrite admix, with and without gel. The proportions of ingredients used (sacks of cement:sacks of anhydrate) and the resulting slurry characteristics and compression strengths are given in Table II. Also included for reference are data on slurries of neat and gel cements as conventionally used for oil well cementing. Replacement of cement with anhydrite admix was on the basis of absolute volume.

TABLE II

*Oil well cementing slurries—Portland cement (API Class A) with anhydrite admix*

(1) 0% gel mixes:

(a) SLURRY CHARACTERISTICS

| Sx C.:Sx AAd, vol. ratio | Replacement of cement, percent by vol. | Water: solids ratio | Density, lbs./gal. | Yield, cu. ft./ sk C. |
|---|---|---|---|---|
| 1:0 | 0 | .469 | 15.7 | 1.170 |
| 19:1 | 5 | .463 | 15.6 | 1.231 |
| 9:1 | 10 | .466 | 15.5 | 1.300 |
| 17:3 | 15 | .468 | 15.5 | 1.376 |
| 2:1 | 33 | .482 | 15.2 | 1.755 |
| 3:2 | 40 | .489 | 15.1 | 1.952 |
| 1:1 | 50 | .491 | 15.0 | 2.338 |
| 2:3 | 60 | .489 | 15.0 | 2.805 |
| 1:2 | 67 | .486 | 14.9 | 3.438 |
| 0:1 | 100 | .527 | 14.3 | |

(b) COMPRESSIVE STRENGTHS, P. S. I.

| Sx C.:Sx AAd, vol. ratio | 80° F. | | 100° F. | | 140° F., 24 hr. |
|---|---|---|---|---|---|
| | 24 hr. | 7 d. | 24 hr. | 7 d. | |
| 1:0 | 2,970 | | 3,280 | | |
| 19:1 | 3,210 | | 3,515 | 7,800 | |
| 9:1 | 2,112 | | 2,730 | 6,610 | |
| 17:3 | 1,592 | | 1,950 | 4,165 | |
| 2:1 | 939 | | 1,243 | | |
| 3:2 | 726 | | 1,061 | | |
| 1:1 | 538 | | 842 | 1,820 | |
| 2:3 | 458 | 1,218 | 685 | 1,283 | |
| 1:2 | 332 | 974 | 471 | 985 | |
| 0:1 | no set in 7 days at 100° F. | | | | |

(2) 4% gel by weight of cement:

(a) SLURRY CHARACTERISTICS

| Sx C.:Sx AAd, vol. ratio | Replacement of cement, percent by vol. | Water: solids ratio | Density, lbs./gal. | Yield, cu. ft./ sk C. |
|---|---|---|---|---|
| 1:0 | 0 | .658 | 14.1 | 1.538 |
| 1:0 | 0 | .682 | 14.0 | 1.577 |
| 19:1 | 5 | .656 | 14.1 | 1.605 |
| 9:1 | 10 | .653 | 14.1 | 1.679 |
| 17:3 | 15 | .650 | 14.1 | 1.762 |
| 2:1 | 33 | .675 | 13.8 | 2.246 |
| 2:1 | 33 | .739 | 13.5 | 2.387 |
| 3:2 | 40 | .684 | 13.8 | 2.493 |
| 3:2 | 40 | .729 | 13.5 | 2.608 |
| 1:1 | 50 | .628 | 14.0 | 2.795 |
| 1:1 | 50 | .650 | 13.9 | 2.852 |
| 1:1 | 50 | .695 | 13.6 | 2.992 |

(b) COMPRESSIVE STRENGTHS, P. S. I.

| Sx C.:Sx AAd, vol. ratio | Water: solids, ratio | 80° F. | | 100° F. | | 140° F., 24 hr. |
|---|---|---|---|---|---|---|
| | | 24 hr. | 7 d. | 24 hr. | 7 d. | |
| 1:0 | .658 | | | 1,460 | 3,595 | |
| 1:0 | .682 | 479 | | 1,307 | | 1,780 |
| 19:1 | .656 | | | 1,710 | 3,770 | |
| 9:1 | .653 | | | 1,850 | 3,530 | |
| 17:3 | .650 | | | 1,345 | 3,435 | |
| 2:1 | .676 | | | 780 | | |
| 2:1 | .739 | 466 | | 657 | | 1,313 |
| 3:2 | .684 | 367 | 884 | 652 | 1,186 | 988 |
| 3:2 | .729 | | | 570 | | |
| 1:1 | .628 | | | 556 | | |
| 1:1 | .650 | 305 | 699 | 526 | 812 | 833 |
| 1:1 | .696 | | | 438 | | |

The data in Table II illustrate several important features of our invention. Small replacements of cement with the anhydrite admix, up to 5% for the 0% gel mixes and up to 10% for the gel mixes, produce higher 24 hour compressive strengths than can be obtained with the neat or gel cements, respectively. Also, even at the low temperature (for an oil well) of 80° F., and with a slurry in which as much as two-thirds of the normal amount of cement is replaced with the admix, compressive strengths developed in 24 hours are sufficiently high to permit drilling or other operations to be resumed. If desired, of course, higher replacements than the values listed in Table II may be used, but with the development of correspondingly lower compressive strengths. Compressive strengths developed may thus be varied at will over a remarkably wide range, from values higher than are obtainable with cement alone to very low values when a high replacement of cement with admix is used.

We find that the low compressive strength slurries offer the advantages of easier perforation either by jet or bullet, and, being less brittle than higher strength cements tend to shatter and crack less, thus maintaining a tighter and more efficient cement job under this and other shock conditions. Heretofore, these desirable, low values have been obtained by use of relatively large amounts of gel, at times as much as 20% by weight, which may be troublesome during the cementing operation because of development of high gel strengths. Moreover, the gel cements show high set shrinkage which may result in an inefficient, loose and leaky cement job. Further, gel has an accelerating effect upon the setting of cement, which makes it dangerous to use in deep or hot holes where a low strength cement may be particularly desirable. As shown hereinafter, the compositions of our invention have set-shrinkages less than half those of neat and gel cements, and in contrast to the accelerated set of the gel cements, the anhydrite admix used in our slurry compositions appreciably retards the set of the cement, even when gel is used. Nevertheless, as shown in Table II high enough 24 hour compressive strengths are developed to permit resumption of drilling. The use of slurry compositions of our invention permits achievement of the desirable low strength values without the disadvantages of high-gel cements, and at the same time gives a better seal, because of their relatively low set-shrinkages.

The absence of cementitious properties for the anhydrite admix used in our new cementing compositions is shown by the 0:1 mix ratio in Table II. This slurry did not change appreciably in consistency, even after "curing" for 7 days in the water bath at 100° F.

We find that our compositions are of greatly reduced set-shrinkage. For example, set-shrinkages of a series of oil well cementing slurries were measured dilatometrically, and recorded in terms of volume shrinkage versus time elapsed after mixing. The results for a neat cement slurry, a 4% gel-cement slurry, and a 4% gel-cement slurry in which 40% of the Portland cement by volume was replaced with an equal absolute volume of anhydrite admix, are given in Table III below:

TABLE III

Oil well cementing slurries

SET-SHRINKAGE EFFECTS

| Hours | Percent shrinkage | | |
|---|---|---|---|
| | neat | 4% gel | 4% gel (2 parts AAd+3 parts C.) by vol. |
| 2 | 0 | 0 | 0 |
| 3 | 0 | 0 | 0 |
| 4 | .03 | .01 | .03 |
| 5 | .18 | .26 | .08 |
| 6 | .31 | .48 | .16 |
| 7 | .43 | .87 | .30 |
| 8 | .74 | 1.03 | .43 |
| 9 | 1.01 | 1.08 | .51 |
| 12 | 1.70 | 1.31 | .81 |
| 19 | 2.25 | 1.76 | 1.30 |
| 20 | 2.34 | 1.82 | 1.36 |
| 22 | 2.46 | 1.92 | 1.43 |
| 26 | 2.69 | 2.09 | 1.51 |
| 28 | 2.80 | 2.19 | 1.55 |
| 30 | 2.88 | 2.26 | 1.58 |
| 36 | 3.10 | 2.43 | 1.62 |
| 44 | 3.26 | 2.61 | 1.64 |
| 48 | 3.27 | 2.67 | 1.65 |
| 51 | 3.23 | 2.73 | 1.63 |
| 60 | 3.16 | 2.83 | 1.62 |
| 70 | 3.10 | 2.90 | 1.61 |
| 78 | 3.04 | 2.93 | 1.61 |
| 95 | 3.01 | 2.93 | 1.59 |

Graphic illustration of the information presented above appears in Fig. 1 of the drawings.

It is to be noted that the set-shrinkage behaviour of the three slurries, at 81°±0.01° F., is quite different. The set-accelerating effect of gel and the set-retarding effect of the anhydrite admix are clearly shown. Two other remarkable differences between the slurries embodying our invention and the conventional cementing slurries are evident. In the first place, the maximum set-shrinkage of the neat and gel cement slurries is nearly twice as great as for the slurry of our composition. And in the second place, in spite of the set-retarding effect of the anhydrite admix, the slurry in which it was used attained 90% of its maximum shrinkage in less time than either of the others; 24 hours for the slurry with anhydrite admix, 32 hours for neat, and 45 hours for the 4% gel cement slurries. The advantages of these properties of the anhydrite admix-cement slurries over the conventional slurries, as has already been pointed out, are a better seal and shut-off because of lower set shrinkage, an attainment of desirable low strength values in deep, hot holes because retarded first set avoids the danger of flash-set of high-gel-content slurries, and an early resumption of well operations because of earlier attainment of a majority of ultimate set.

An added advantage of our cementing compositions is that, while developing adequate 24 hour strengths to permit resumption of well operations safely, the allowable pumping time is markedly greater than for conventional neat and gel cements. Values of thickening time (allowable pumping time) were measured in a Halliburton Consistometer, over the temperature range from 80° F. to 140° F., the slurries being stirred at the higher temperature, after once reaching that temperature, until a consistency of 100 poises was obtained. Thickening times for typical slurries of our composition (Sx abbreviation for sacks), and for comparison, for conventional neat and gel cement slurries are tabulated in Table IV:

TABLE IV

*Oil well cementing slurries*

THICKENING TIME—HALLIBURTON CONSISTOMETER
[80°–140° F. schedule]

(1) 0% GEL SLURRIES

| Sx C.:Sx AAd vol. ratio | Water: solids, ratio | Density, lbs./gal. | Yield, cu. ft./ sk C. | Minutes to 100 poises |
| --- | --- | --- | --- | --- |
| 1:0 | .460 | 15.7 | 1.17 | 157 |
| 2:1 | .504 | 15.0 | 1.81 | 212 |
| 1:1 | .491 | 15.0 | 2.34 | 269 |
| 2:3 | .497 | 14.9 | 2.93 | 352 |
| 1:2 | .502 | 14.8 | 3.51 | 433 |

(2) 4% GEL, BY WEIGHT OF CEMENT, SLURRIES

| 1:0 | .645 | 14.2 | 1.52 | 121 |
| --- | --- | --- | --- | --- |
| 2:1 | .633 | 14.1 | 2.15 | 178 |
| 1:1 | .627 | 14.0 | 2.79 | 232 |
| 2:3 | .623 | 14.0 | 3.43 | 243 |
| 1:2 | .571 | 14.3 | 3.86 | 290 |

Graphic illustration of the thickening time for the slurries of Table IV is given in Fig. 2 of the drawing, curves 1 and 2.

It is seen in every case slurries of our compositions showed a markedly longer thickening time than the corresponding neat and gel cement slurries. And, as pointed out above, this factor shows a remarkable and valuable advantage of the compositions embodying our invention, in that the slurries stay fluid, or pumpable for a longer time than do the slurries conventionally used, thus removing the danger of "flash-set," preventing set during reasonably long shut-down periods during cementing, and facilitating clean-up of cementing equipment when job is finished.

Tests simulating cementing an oil well to a depth of 10,000 feet showed that the benefits of increased thickening time for slurries embodying our invention are available under field conditions. Some results of these tests are tabulated in Table V:

TABLE V

*Oil well cementing slurries*

THICKENING TIMES UNDER SIMULATED FIELD CONDITIONS

[10,000 foot schedule, API Class A Cement]

| Sx C.:Sx AAd vol. ratio | Gel, wt. Percent of dry mix | Density, lbs./gal. | Minutes to 100 poises |
| --- | --- | --- | --- |
| 1:0 | 0 | 15.7 | 78 |
| 1:1 | 0 | 15.0 | 140 |
| 1:2 | 0 | 14.9 | 177 |
| 1:0 | 2 | 14.9 | 69 |
| 1:1 | 2 | 14.3 | 97 |
| 1:2 | 2 | 14.2 | 118 |

In the simulated well tests bottom-hole pressure of 7500 pounds per square inch and temperature of 144° F. were reached in about 1 hour 5 minutes, and those conditions were maintained until a viscosity of 100 poises was indicated. It can be seen from Table V, and also from the curves 3 and 4 of Fig. 2 of the drawings in which this information is graphically presented, that slurries of our composition gave allowable pumping times ranging from about 30 minutes to about 1½ hours longer than did the conventional cementing slurries.

A most valuable and remarkable feature of the compositions of our invention is the surprising high resistance to deterioration by corrosive waters. This property was measured by immersing 1" x 1" x 11" test bars in a 5% solution of sodium sulphate in water and examining the bars at intervals for signs of attack by the solution. The time of exposure required to produce surface checks and cracks was recorded as time to failure of the bar. The time for complete disintegration, or falling apart of the bar, was recorded also. Typical data for slurries of our new compositions, using API Class A Portland cement, which is not considered to be very resistant to sulphate deterioration, are tabulated in Table VI along with similar data for conventional slurries using the same cement, mixed at the same time, and subjected to exposure in the same baths as the others:

TABLE VI

*Oil well cementing slurries*

RESISTANCE TO DETERIORATION BY CORROSIVE WATERS

[Exposure to 5% sodium sulphate solution at 75° F.]

| Sx C.:Sx AAd vol. ratio | Gel, lbs./ sk C. | Exposure, days | Days to failure | |
| --- | --- | --- | --- | --- |
| | | | 1st crack | fell apart |
| 1:0 | 0 | 389 | 193 | 389 |
| 19:1 | 0 | 419 | not yet | |
| 3:2 | 0 | 499 | ...do... | |
| 1:1 | 0 | 499 | ...do... | |
| 1:0 | 4 | 150 | 112 | 150 |
| 2:1 | 4 | 513 | not yet | |
| 3:2 | 4 | 513 | ...do... | |
| 1:1 | 4 | 513 | ...do... | |

From the data of Table VI it is seen that the conventional gel cement is most susceptible to sulphate deterioration, lasting less than 4 months in the test bath before cracks appeared. Neat cement seems to be considerably better, showing cracks at 6½ months. The very great superiority of the cements embodying our invention however, is demonstrated by the fact that test bars of our new compositions exhibit no visible signs of deterioration even after exposure of 16½ months of slurries without gel, and 17 months for the slurries with gel. It appears that the compositions of our invention display at least 3 or 4 times the resistance to deterioration by corrosive waters as do the conventional-cementing compositions. The difference is so great as to be one of kind rather than one merely of degree.

From the data already presented it is apparent that the compositions of our invention are remarkably superior to conventional compositions used for oil well cementing. Use of our invention results in great economies in oil development and production operations through facilitating well cementing and servicing, and as well through lowering services needed during the life of the well because of a better, more efficient, and longer-lived cementing job. In addition, further economies result from the fact that the compositions of our invention are less costly to the well operator per cubic foot of fill-up than are the compositions conventionally used. The anhydrite admix, made from extensive and relatively low cost natural surface deposits of gypsiferous earth, and processed by the relatively inexpensive procedure described herein, is made at a cost considerably below that of the Portland cement it replaces. Consequently, immediate as well as long term savings are realized through use of our invention in oil well cementing practices.

A practical example of the value of our invention is furnished by the following wherein a surface string of 450 feet of 13⅜", 54.5 lb. casing was cemented in a nominal 17½" hole. Cementing schedule called for 325 sacks of API Class A Portland cement with 800 pounds of bentonite gel, to be followed by 125 sacks of neat cement. Instead of gel cement, a 3:2 mix of our invention was made of:

195 sacks (@ 94 lb.) API Class A cement
130 sacks (@ 82 lb.) anhydrite admix
8 sacks (@ 100 lb.) Wyoming bentonite gel Mixing of the dry ingredients was done at a bulk plant, and the mix was loaded into a bulk cement truck for transport to the job. The admix handled with great ease, both by itself and in the mix, in all mixing, conveying, loading, hauling and transfer equipment. There were no adverse packing effects in the bulk truck in transit to the job.

Actual cementing was started at 9:46 P. M. and was completed at 10:04 P. M. without any difficulty whatever. The dry-mix handled as well as or better than cement by itself in the bulk truck conveyors, jet mixer, and in the pumping equipment. Slurry density measurements made frequently during mixing varied little from an average of 13.6 pounds per gallon. Drilling was resumed 25½ hours after plug was stopped, and the job was reported as satisfactory.

A sample of the dry mix taken during mixing from the jet mixer hopper was sent to the laboratory for checking, along with a jug of the water used. Data from the laboratory tests were as follows:

[Slurry density—13.69 lbs./gal.]

| 24 hr. compressive strength | Job water | Distilled water |
|---|---|---|
| cured at 80° F | 463 | 455 |
| cured at 100° F | 533 | 696 |

Using prices current in the area at time of the use described above savings in cost of materials to the well operator through use of our new product was 8 cents per cubic foot of fill. When it is considered that the total slurry requirement of the well before its completion was estimated to be in excess of 7600 cubic feet, total savings in cost of materials was indicated to be greater than $600 for the one well. This realistically illustrates the economy to the oil industry which may be realized through use of our invention.

Thus it will be seen that the various objects of our invention as set forth above, and the many advantages thereof, are had with our new composition and well bore. The composition is inexpensive, readily prepared, easily transported and effectively used with desired slow-setting properties yet adequate strength in 24 hours, all with a minimum of set-shrinkage. Bores and well holes according to our invention possess greater seal and shut-off and possess much greater resistance to the corrosive effects of the sub-surface waters encountered than those of the prior art.

All the foregoing, as well as many other highly practical advantages, attend upon the practice of our invention.

It is apparent from the foregoing that once the broad aspects of our invention are disclosed to those skilled in the art, many embodiments thereof will readily suggest themselves, all falling within the spirit of our disclosure. Moreover, many modifications of the present embodiment will likewise present themselves. Accordingly, we desire that the foregoing disclosure be considered as merely illustrative, and not by way of limitation.

We claim as our invention:

1. A cement slurry of slow-setting characteristics and moderate set-strength with low-set shrinkage consisting of anhydrous calcium sulphate 33% to 67% by volume of solid constituents, Portland cement 67% to 33% by volume of solid constituents, Wyoming bentonite about 2% to 4% by weight of cement, and water in amount of about 45% to 75% of solid constituents to impart slurry characteristics.

2. An oil well cement slurry of slow-setting characteristics, moderate set-strength and low-set shrinkage, said mix consisting of anhydrous calcium sulphate 33% to 50% by volume of solid constituents, Portland cement 67% to 50% by volume of solid constituents, about 2% to 4% bentonite, this by weight of the mix, and water in the amount of about 45% to 75% of solid constituents.

3. An oil well cement slurry possessing low set-shrinkage, moderate set-strength and slow-setting characteristics, said mix consisting of anhydrous calcium sulphate about 40% by volume, Portland cement about 60% by volume, bentonite about 4% by weight, and water in the amount of about 45% to 75% of solid constituents.

References Cited in the file of this patent

UNITED STATES PATENTS

| | | |
|---|---|---|
| 678,412 | Lessing | July 16, 1901 |
| 1,157,234 | Lester | Oct. 19, 1915 |
| 1,967,959 | McAnally | July 24, 1934 |
| 2,248,032 | Dunn et al. | July 1, 1941 |
| 2,362,060 | Etridge et al. | Nov. 7, 1944 |
| 2,562,148 | Lea et al. | July 24, 1951 |
| 2,582,459 | Salathiel | Jan. 15, 1952 |

FOREIGN PATENTS

| | | |
|---|---|---|
| 374,455 | Great Britain | June 6, 1932 |